US010262629B2

(12) United States Patent
Sakaguchi

(10) Patent No.: US 10,262,629 B2
(45) Date of Patent: Apr. 16, 2019

(54) DISPLAY DEVICE

(71) Applicant: Toyota Jidosha Kabushiki Kaisha, Toyota-shi, Aichi-ken (JP)

(72) Inventor: Eiji Sakaguchi, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 15/176,451

(22) Filed: Jun. 8, 2016

(65) Prior Publication Data
US 2016/0365068 A1 Dec. 15, 2016

(30) Foreign Application Priority Data

Jun. 10, 2015 (JP) .................................. 2015-117740

(51) Int. Cl.
| | | |
|---|---|---|
| *G09G 3/00* | (2006.01) | |
| *G09G 5/10* | (2006.01) | |
| *G09G 5/30* | (2006.01) | |
| *B60K 35/00* | (2006.01) | |

(52) U.S. Cl.
CPC ............. *G09G 5/10* (2013.01); *B60K 35/00* (2013.01); *G09G 3/002* (2013.01); *G09G 5/30* (2013.01); *G09G 2320/0626* (2013.01); *G09G 2340/045* (2013.01); *G09G 2360/144* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 8,953,840 B2* | 2/2015 | Nagaoka | ................... | B60R 1/00 348/143 |
| 2010/0253493 A1* | 10/2010 | Szczerba | ............... | G01S 13/723 340/435 |
| 2010/0253539 A1 | 10/2010 | Seder et al. | | |
| 2011/0202240 A1* | 8/2011 | Rottner | .................. | B60Q 1/484 701/42 |
| 2014/0121883 A1* | 5/2014 | Shen | .................. | B62D 15/0285 701/28 |
| 2015/0032288 A1* | 1/2015 | Huth | ...................... | G08G 1/165 701/1 |
| 2015/0291032 A1* | 10/2015 | Kim | ....................... | B60K 37/06 701/36 |

FOREIGN PATENT DOCUMENTS

| | | |
|---|---|---|
| JP | 2008055943 A | 3/2008 |
| JP | 2008252784 A | 10/2008 |

* cited by examiner

*Primary Examiner* — Kyle Zhai
(74) *Attorney, Agent, or Firm* — Dinsmore & Shohl LLP

(57) ABSTRACT

A display device in one aspect of the present disclosure includes an object detection unit that detects an object positioned ahead of a host vehicle, a distance detection unit that detects a distance between the host vehicle and the object, a display unit that projects and displays information on the object onto a windshield of the host vehicle; and a display control unit that controls the display unit. The display control unit reduces a display brightness or a display area when the distance between the host vehicle and the object is smaller than a first threshold as compared to when the distance between the host vehicle and the object is equal to or larger than the first threshold and stops the display when the distance between the host vehicle and the object is smaller than a second threshold that is smaller than the first threshold.

5 Claims, 13 Drawing Sheets

DISPLAY DEVICE

CROSS-REFERENCE TO RELATED APPLICATIONS

This application claims priority to Japanese Patent Application No. 2015-117740 filed on Jun. 10, 2015, the entire contents of which are hereby incorporated by reference.

BACKGROUND

1. Field

The present disclosure relates to a display device that projects a display onto the windshield of a vehicle.

2. Description of Related Art

Conventionally, US 2010/0253539 A is known as a technical document that relates to a display device for projecting information on objects, such as a preceding vehicle, onto the windshield of a vehicle. US 2010/0253539 A describes a device that includes a Head-Up Display (HUD) for projecting and displaying information on objects onto the windshield of a vehicle.

However, the device described above has the following problem. For example, when parking in a parking lot, the driver sometimes wants to directly and visually recognize an object even when the information on objects is displayed on the windshield. In such a case, the display of object information on the windshield sometimes obstructs the driver from visually recognizing an object.

Therefore, in this technical field, a display device is desired that reduces the possibility that the display of object information on the windshield obstructs the driver from visually recognizing an object.

SUMMARY

A display device in a first aspect of the present disclosure includes an object detection unit that detects an object positioned ahead of a host vehicle, a distance detection unit that detects a distance between the host vehicle and the object, a display unit that projects a display of information on the object onto a windshield of the host vehicle, and a display control unit that controls the display unit. The display control unit either reduces a brightness of the display or a display area of the display when the distance between the host vehicle and the object is smaller than a first threshold as compared to when the distance between the host vehicle and the object is equal to or larger than the first threshold and stops the display when the distance between the host vehicle and the object is smaller than a second threshold that is smaller than the first threshold; or reduces the brightness of the display or the display area of the display as the distance between the host vehicle and the object becomes smaller and stops the display when the distance between the host vehicle and the object is smaller than a third threshold.

The display device in the first aspect of the present disclosure reduces the display brightness or the display area of the object information on the windshield as the distance between the host vehicle and the object becomes smaller. In addition, this display device stops the display of information on the object when the distance between the host vehicle and the object becomes smaller than the second threshold or the third threshold. Therefore, when the distance between the host vehicle and the object becomes smaller and the driver directly and visually recognizes the object, this display device reduces the possibility that the display on the windshield obstructs the driver's visual field and thus reduces the possibility that the display obstructs the driver from visually recognizing the object.

A display device in a second aspect of the present disclosure includes an object detection unit that detects an object positioned ahead of a host vehicle, a distance detection unit that detects a distance between the host vehicle and the object, a display unit that projects a display of information on the object onto a windshield of the host vehicle, a display control unit that controls the display unit, a position information acquisition unit that acquires position information on the host vehicle, a map information storage unit that stores therein map information including parking area information, and a parking area determination unit that determines whether the host vehicle is positioned in the parking area based on the position information on the host vehicle and the map information. The display control unit either reduces a brightness of the display or a display area of the display when the parking area determination unit determines that the host vehicle is positioned in the parking area and when the distance between the host vehicle and the object is smaller than a first threshold as compared to when the distance between the host vehicle and the object is equal to or larger than the first threshold, and stops the display when the distance between the host vehicle and the object is smaller than a second threshold that is smaller than the first threshold; or reduces the brightness of the display or the display area of the display as the distance between the host vehicle and the object becomes smaller when the parking area determination unit determines that the host vehicle is positioned in the parking area, and stops the display when the parking area determination unit determines that the host vehicle is positioned in the parking area and when the distance between the host vehicle and the object is smaller than a third threshold.

The driver is required to confirm the situation around the vehicle more carefully in a parking area than on a road. Therefore, in order to avoid the case in which the display of information on the object on the windshield obstructs the driver from confirming the situation, the display device in another aspect of the present disclosure reduces the display brightness or the display area of object information on the windshield when the distance between the host vehicle and the object becomes smaller in a parking area. In addition, when the distance between the host vehicle and the object becomes smaller than the second threshold or the third threshold in a parking area, this display device stops the display of information on the object. Therefore, when the distance between the host vehicle and the object becomes smaller in a parking area and the driver directly and visually recognizes the object, this display device reduces the possibility that the display on the windshield obstructs the driver's visual field and reduces the possibility that the display obstructs the driver from visually recognizing the object.

The display device in the first aspect of the present disclosure described above may further include a daytime/nighttime determination unit that determines whether it is daytime or nighttime outside the host vehicle, and a threshold setting unit that either sets at least one of the first threshold and the second threshold to a larger value when the daytime/nighttime determination unit determines that it is nighttime outside the host vehicle than when the daytime/nighttime determination unit determines that it is daytime; or sets the third threshold to a larger value when the daytime/nighttime determination unit determines that it is nighttime outside the host vehicle than when the daytime/nighttime determination unit determines that it is daytime. The display on the windshield distracts the driver's attention and obstructs the driver from visually recognizing an object more often in the nighttime than in the daytime. Therefore, by setting the first threshold to a larger value when it is determined to be nighttime than when it is determined to be daytime, this display device allows the display brightness or the display area to be reduced sooner when the first threshold is used. In addition, by setting the second threshold or the third threshold to a larger value when it is determined to be nighttime than when it is determined to be daytime, this display device allows the display to be stopped sooner based on the distance between the host vehicle and the object. Therefore, according to whether it is daytime or nighttime, this display device can suitably reduce the possibility that the display of information on the object on the windshield obstructs the driver from visually recognizing the object.

The display device in the first of the present disclosure described above may further include a daytime/nighttime determination unit that determines whether it is daytime or nighttime outside the host vehicle. The display control unit may reduce the brightness of the display or the display area of the display when the daytime/nighttime determination unit determines that it is nighttime outside the host vehicle than when the daytime/nighttime determination unit determines that it is daytime. The display on the windshield distracts the driver's attention and obstructs the driver from visually recognizing an object more often in the nighttime than in the daytime. Therefore, if the daytime/nighttime determination unit that determines that it is nighttime outside the host vehicle, this display device reduces the display brightness or the display area when the daytime/nighttime determination unit determines that it is nighttime outside the host vehicle as compared to when the daytime/nighttime determination unit determines that it is daytime. Therefore, according to whether it is daytime or nighttime, this display device can suitably reduce the possibility that the display of information on the object on the windshield obstructs the driver from visually recognizing the object.

A display device in a third aspect of the disclosure includes a display unit configured to project information on an object positioned ahead of a host vehicle onto a windshield of the host vehicle; and an ECU that detects a distance between the host vehicle and the object and controls an information display on the display unit, wherein the ECU either reduces a brightness of the display or a display area of the display when the distance between the host vehicle and the object is smaller than a first threshold as compared to when the distance between the host vehicle and the object is equal to or larger than the first threshold and stops the display when the distance between the host vehicle and the object is smaller than a second threshold that is smaller than the first threshold; or reduces the brightness of the display or the display area of the display as the distance between the host vehicle and the object becomes smaller and stops the display when the distance between the host vehicle and the object is smaller than a third threshold.

A display device in a third aspect of the disclosure includes a display unit configured to project information on an object positioned ahead of a host vehicle onto a windshield of the host vehicle a navigation system that stores therein map information including parking area information; and an ECU configured to detect a distance between the host vehicle and the object, control the display unit, acquire position information on the host vehicle, and determine whether the host vehicle is positioned in a parking area based on the position information on the host vehicle and the map information, wherein the ECU either reduces a brightness of a display or a display area of the display when it is determined that the host vehicle is positioned in the parking area and when the distance between the host vehicle and the object is smaller than a first threshold as compared to when the distance between the host vehicle and the object is equal to or larger than the first threshold, and stops the display when the distance between the host vehicle and the object is smaller than a second threshold that is smaller than the first threshold; or reduces the brightness of the display or the display area of the display as the distance between the host vehicle and the object becomes smaller when it is determined that the host vehicle is positioned in the parking area, and stops the display when it is determined that the host vehicle is positioned in the parking area and when the distance between the host vehicle and the object is smaller than a third threshold.

As described above, the display device in the aspects of the present disclosure can reduce the possibility that the display of information on the object displayed on the windshield obstructs the driver from visually recognizing the object.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure are described below with reference to the drawings.

Figure 1:
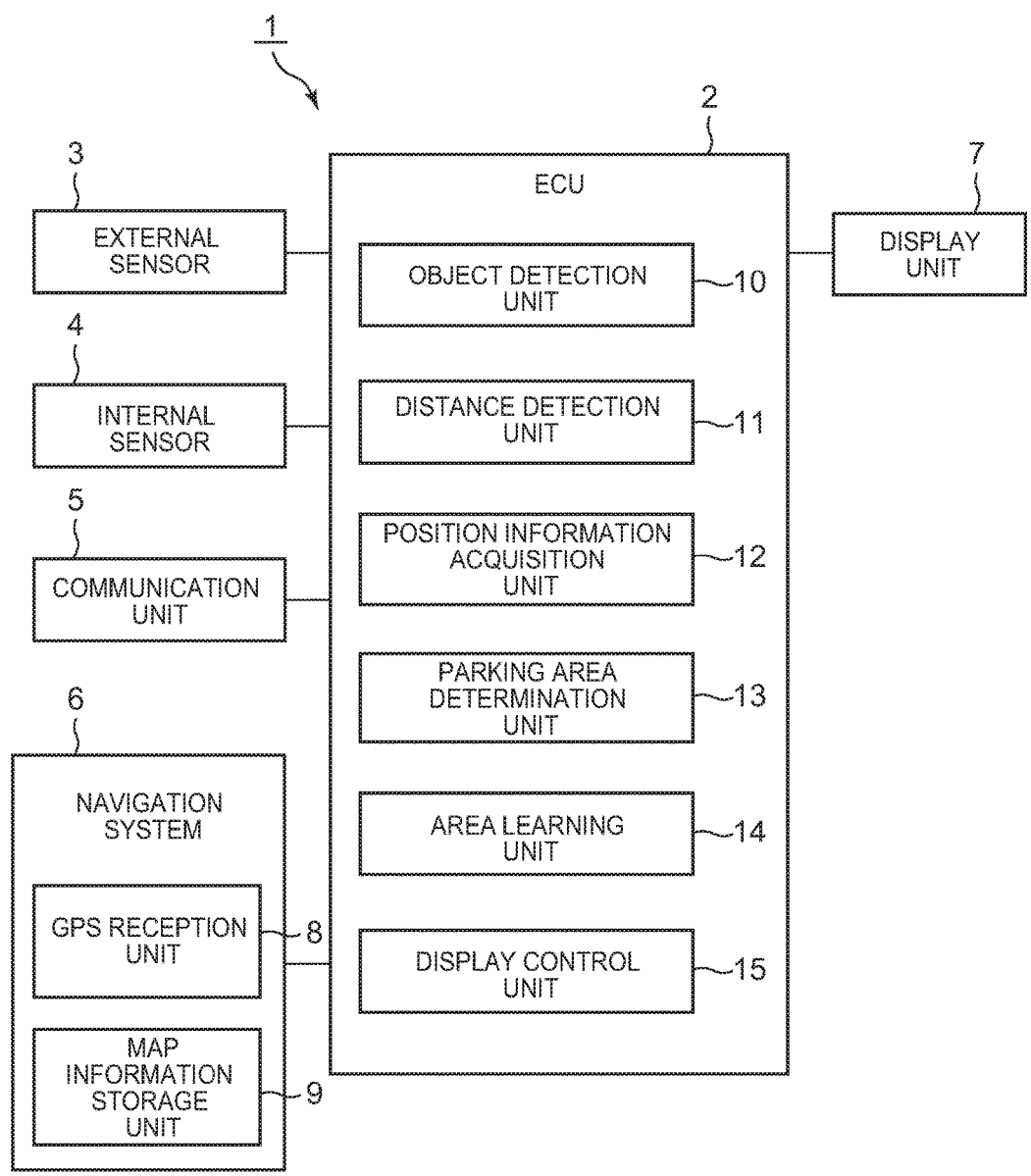
FIG. 1 is a block diagram showing a display device in a first embodiment.

[First embodiment] A display device 1 in a first embodiment shown in FIG. 1, mounted on a vehicle (hereinafter called a host vehicle) such as a passenger car, is a device that projects the display of various types of information onto the windshield of the host vehicle. The various types of information include at least object information that is the information on objects. An example of the objects is preceding vehicles. Preceding vehicles mean other vehicles traveling ahead in the lane in which the host vehicle is traveling. The objects may include pedestrians, bicycles, other vehicles, and structures (such as a wall) that are ahead of the host vehicle. The object information includes the information indicating the presence of an object. The object information may also include the information indicating that the host vehicle is performing control for an object (for example, the host vehicle is performing tracking control for the preceding vehicles).

In addition to the display device 1, a driving assistance device for assisting the driver in driving the host vehicle is mounted on the host vehicle in this embodiment. The display device 1 may be configured as a part of the driving assistance device. For example, based on the information captured by the camera that captures the area ahead of the host vehicle, the driving assistance device recognizes the two white lines that form the lane in which the host vehicle is traveling (lane boundaries, vehicular lane boundaries, etc.). In addition, based on the detection information detected by a radar that detects the obstacles around the host vehicle, the driving assistance device detects a preceding vehicle. In addition, based on the detection information detected by the radar, the driving assistance device recognizes the distance between the host vehicle and a preceding vehicle.

The driving assistance device performs Adaptive Cruise Control (ACC) based on the driver's operation. ACC refers to a control system that performs the following two types of control: one is the constant-speed control for causing the host vehicle to travel at a pre-set constant speed when there is no preceding vehicle ahead of the host vehicle, and the other is the tracking control for causing the host vehicle to adjust the host vehicle speed according to the inter-vehicle distance to a preceding vehicle when there is a preceding vehicle ahead of the host vehicle. In addition, the driving assistance device may perform Lane Trace Control (LTC) based on the driver's operation. LTC refers to a control system that autonomously steers the host vehicle so that the vehicle does not depart from the traveling lane. LTC allows the host vehicle to steer itself autonomously along the traveling lane even when the driver does not perform the steering operation. Even while LTC is in operation, the driving assistance device may reflect the driver's steering operation on the vehicle steering in a range in which the vehicle does not depart from the traveling lane (allowable range). In addition, the driving assistance device may perform the curve deceleration control for decelerating and adjusting the speed before the host vehicle enters a curve. The driving assistance device can perform various types of known control for assisting the driver in driving. The host vehicle need not necessarily include the driving assistance device.

Figure 2:
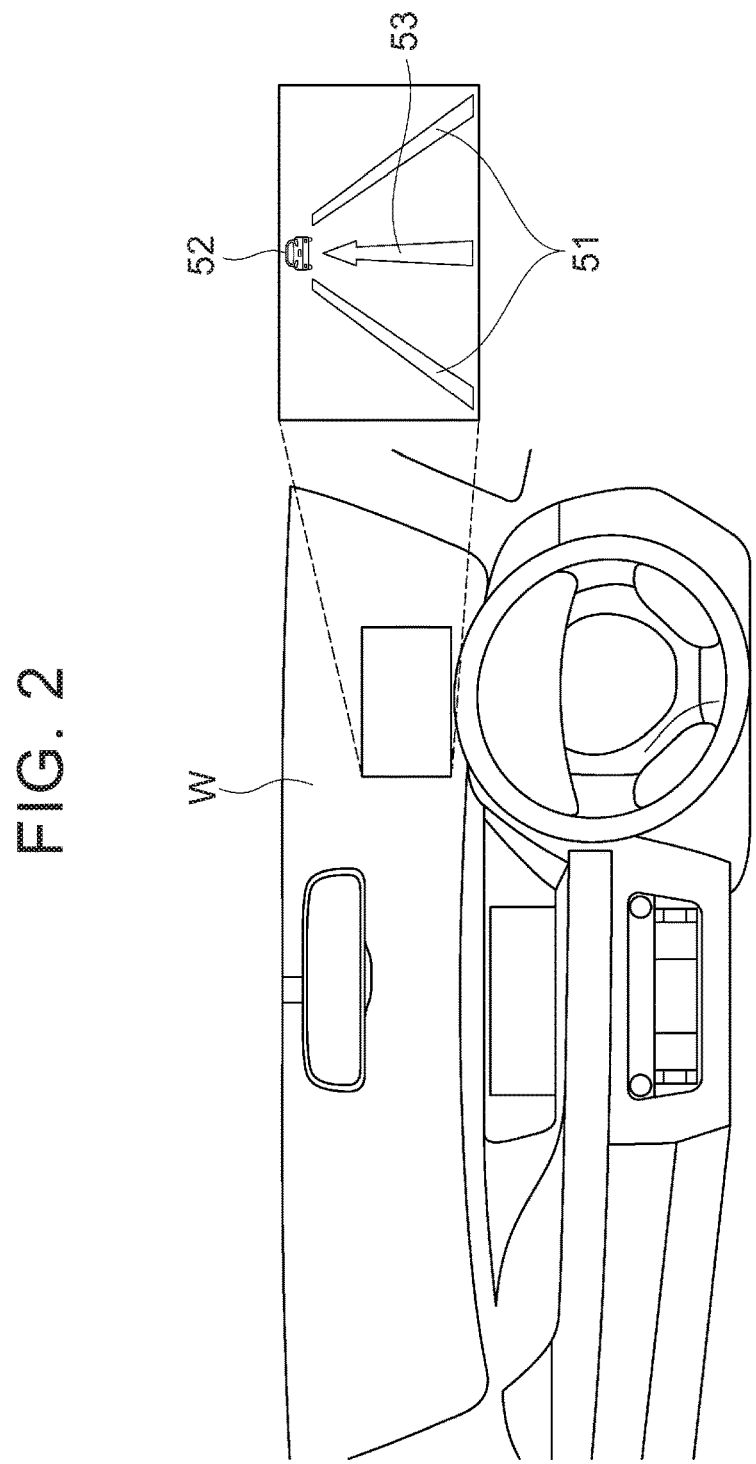
FIG. 2 is a diagram showing an object information display on the windshield.

FIG. 2 is a diagram showing an object information display on the windshield. As shown in FIG. 2, the display device 1 displays the object information on the windshield W in a range in front of the driver's seat (in front of the driver's head) and in the bottom half of the windshield W. In FIG. 2, a white-line display 51, a preceding-vehicle (object) display 52, and a preceding-vehicle tracking control display 53 are projected on the windshield W.

The white-line display 51 is a display indicating the white lines recognized by the camera. The white-line display 51 is displayed when the host vehicle performs ACC or LTC. The preceding-vehicle display 52 is a display indicating a preceding vehicle detected by the radar mounted on the host vehicle. The object information display includes at least the preceding-vehicle display 52. The preceding-vehicle display 52 is displayed on the windshield W when a preceding vehicle is detected by the radar.

The preceding-vehicle tracking control display 53 is a display of an arrow indicating that the host vehicle, which is traveling under ACC, is performing the tracking control for a preceding vehicle. The preceding-vehicle tracking control display 53 is displayed while the host vehicle is performing the tracking control. In this embodiment, the preceding-vehicle tracking control display 53 is included in the object information display. The preceding-vehicle tracking control display 53 need not necessarily be displayed.

FIG. 2 shows only an example, and the object information display is not limited to the display mode shown in FIG. 2. The object information display area on the windshield W is not limited to the area shown in FIG. 2 but is required only to be an area on the windshield W.

The display device 1 changes the object information display mode according to the distance between the host vehicle and an object. The display device 1 reduces the display brightness or the display area of the object information as the distance between the host vehicle and an object becomes smaller. The brightness is the luminance of display. When there are two or more positions of different brightness on one display, the average of the brightness values may be used as the display brightness. The display area is an area (dimensions) on the windshield W occupied by the display.

The display device 1 reduces the display brightness or the display area of the object information in stages according to the distance between the host vehicle and an object. More specifically, when the distance between the host vehicle and an object is smaller than a first threshold, the display device 1 reduces the display brightness or the display area of the object information as compared to when the distance between the host vehicle and the object is equal to or larger than the first threshold. The first threshold is a value that is appropriately set in advance for reducing the display brightness or the display area so that the display on the windshield W does not obstruct the viewing of an object when the driver visually recognizes the object. The first threshold may be a fixed value (for example, 20 m) or a value that varies according to the situation.

The display device 1 may continuously reduce the display brightness or the display area of the object information according to the distance between the host vehicle and an object. That is, the display device 1 may continuously reduce the display brightness or the display area of the object information as the distance between the host vehicle and an object becomes smaller.

Figure 3A:
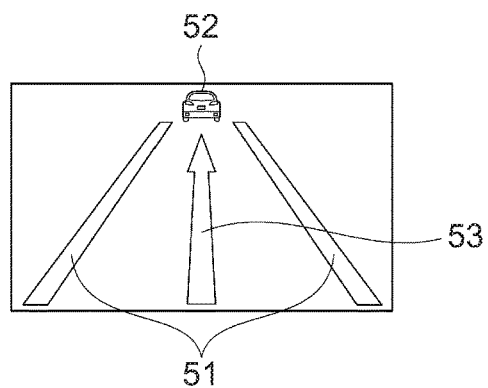
FIG. 3A is a diagram showing an object information display at usual time.
Figure 3B:
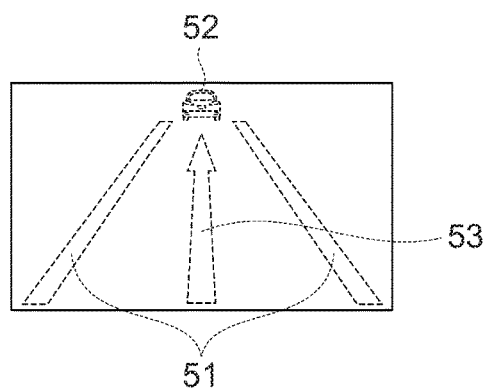
FIG. 3B is a diagram showing an object information display when the brightness is reduced.
Figure 3C:
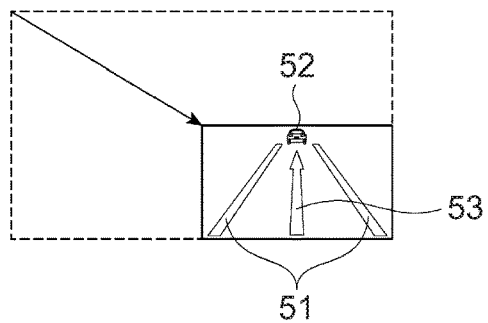
FIG. 3C is a diagram showing an object information display when the display area is reduced.

FIG. 3A is a diagram showing an object information display at usual time. FIG. 3B is a diagram showing an object information display when the brightness is reduced. In FIG. 3B, the state in which the display brightness is reduced is indicated by broken lines. FIG. 3C is a diagram showing a display when the display area is reduced. In this embodiment, the display modes of all of the white-line display 51, preceding-vehicle display 52, and preceding-vehicle tracking control display 53 are changed at the same time. The display mode of displays other than the object information display may also be changed in the manner similar to that of the object information display.

FIG. 3C shows a mode in which the display area of the white-line display 51, preceding-vehicle display 52, and preceding-vehicle tracking control display 53 is reduced in the bottom-right direction. FIG. 3C shows only an example of the mode. The object information display may be in the mode in which the display area is reduced in the top-right direction, bottom-left direction, or top-left direction or may be in the mode in which the display area is reduced in the central direction. The object information display may also be in the mode in which the display area is reduced by narrowing the top and bottom widths or the right and left widths.

When the distance between the host vehicle and an object is smaller than the first threshold, the display device 1 may reduce both the display brightness and the display area as compared to when the distance between the host vehicle and the object is equal to or larger than the first threshold. Similarly, the display device 1 may continuously reduce both the display brightness and the display area as the distance between the host vehicle and the object becomes smaller.

When the distance between the host vehicle and the object becomes larger, the display device 1 restores the display brightness and the display area of the object information, which have been reduced, back to the original brightness and the original size. For example, when the distance between the host vehicle and the object become smaller than the first threshold and the display brightness is reduced and, after that, the distance between the host vehicle and the object becomes equal to or larger than the first threshold again, the display device 1 restores the display brightness to the original level. When the display device 1 continuously reduces the display brightness as the distance between the host vehicle and the object becomes smaller, the display device 1 continuously increases the display brightness as the distance between the host vehicle and the object becomes larger. The display device 1 similarly increases or decreases the display area. The display device 1 does not increase the display brightness or the display area beyond the original brightness or the original size.

When the distance between the host vehicle and the object is smaller than a second threshold, the display device 1 stops the object information display. That is, when an object is detected but the distance between the host vehicle and the object is smaller than the second threshold, the display device 1 does not display the object information on the windshield W. The second threshold is a value that is set appropriately in advance for stopping the display so that the display on the windshield W does not obstruct the viewing of an object when the driver visually recognizes the object. The second threshold may be a fixed value (for example, 10 m) or a value that varies according to the situation. When the display device 1 uses the first threshold, the second threshold is set as a value smaller than the first threshold. In addition, when the distance between the host vehicle and the object becomes smaller than the second threshold and the object information display is stopped and, after that, the distance between the host vehicle and the object becomes equal to or larger than the second threshold, the display device 1 redisplays the object information.

When the display brightness or the display area are continuously changed according to the distance between the host vehicle and an object (the first threshold is not used), the display device 1 stops the object information display when the distance between the host vehicle and the object becomes smaller than a third threshold. The third threshold is a value that is set appropriately in advance for stopping the display so that the display on the windshield W does not obstruct the viewing of an object when the driver visually recognizes the object. The third threshold may be a fixed value (for example, 10 m) or a value that varies according to the situation. It is required to set only one of the second threshold and the third threshold.

The display device 1 may change the display mode or may stop the display as described above only under a particular condition. More specifically, the display device 1 determines whether the host vehicle is positioned in a parking area based on the host vehicle's position information, detected by the Global Positioning System (GPS), and the map information. The parking area refers to an area on the map where the host vehicle can park. The parking area includes parking lots (service area and parking areas on an expressway, multistory parking garages, etc.) on the map. The parking area may also include a parking section within facilities, an open space, and an empty lot. The display device 1 stores the map information that includes the parking area information that is the position information on the parking areas. The display device 1 may wirelessly acquire the map information, which includes the parking area information, from the computer in the facilities such as the information management center.

If it is determined that the host vehicle is positioned in a parking area, the display device 1 reduces the display brightness, or changes the display area, according to the distance between the host vehicle and an object. In other words, if it is determined that the host vehicle is not positioned in a parking area, the display device 1 does not change the display brightness, nor does it change the display area, according to the distance between the host vehicle and the object. If it is determined that the host vehicle is positioned in a parking area and the distance between the host vehicle and the object is smaller than the first threshold, the display device 1 reduces the display brightness or the display area of the object information as compared to when the distance between the host vehicle and the object is equal to or larger than the first threshold. If it is determined that the host vehicle is positioned in a parking area when the first threshold is not used, the display device 1 continuously reduces the display brightness or the display area of the object information as the distance between the host vehicle and the object becomes smaller.

If it is determined that the host vehicle is positioned in a parking area and the distance between the host vehicle and the object is smaller than the second threshold or the third threshold, the display device 1 stops the object information display. In other words, if it is determined that the host vehicle is not positioned in a parking area, the display device 1 does not stop the object information display even when the distance between the host vehicle and the object is smaller than the second threshold or the third threshold.

<Configuration of the display device in the first embodiment> The configuration of the display device 1 in the first embodiment is described below with reference to the drawings. As shown in FIG. 1, the display device 1 includes an Electronic Control Unit (ECU) 2 that integrally controls the device.

The ECU 2 is an electronic control unit that includes a Central Processing Unit (CPU), a Read-Only Memory (ROM), and a Random Access Memory (RAM). The ECU 2 is connected to an external sensor 3, an internal sensor 4, a communication unit 5, a navigation system 6, and a display unit 7.

The external sensor 3 is a detection apparatus for detecting the external situation that is the surrounding information on the host vehicle. The external sensor 3 includes at least one of an on-vehicle camera, a radar, and a Laser Imaging Detection and Ranging (LIDAR).

The on-vehicle camera is provided, for example, on the interior side of the windshield W of the host vehicle. The on-vehicle camera sends the captured information on the external situation of the host vehicle to the ECU 2. The camera may be a monocular camera or a stereo camera. The stereo camera includes two capturing units arranged so that the disparity between the right eye and the left eye is reproduced. The information captured by the stereo camera also includes the depth direction information (distance information).

The radar detects an obstacle outside the host vehicle using a radio wave (for example, a millimeter wave). The radar detects an obstacle (other vehicles, pedestrians, bicycles, structures, etc.) by sending a radio wave to the surroundings of the host vehicle and by receiving a radio wave reflected by the obstacle. The obstacle means an object to be detected by the radar or the LIDAR. The obstacle is not always an object mentioned in this embodiment. The radar sends the detected obstacle information to the ECU 2.

The LIDAR detects an obstacle outside the host vehicle using light. The LIDAR measures the distance to a reflection point and detects an obstacle by sending light to the surroundings of the host vehicle and by receiving light reflected by the obstacle. The LIDAR sends the detected obstacle information to the ECU 2. Two or more of the camera, LIDAR, and radar need not necessarily be installed.

The internal sensor 4 is a detection apparatus that detects the traveling state of the host vehicle. The internal sensor 4 includes a vehicle speed sensor. The vehicle speed sensor is a detection apparatus that detects the speed of the host vehicle. As the vehicle speed sensor, a wheel speed sensor is used. The wheel speed sensor is provided on the wheels of the host vehicle or on a component such as the drive shaft, which rotates in synchronization with the wheels, to detect the rotation speed of the wheels. The vehicle speed sensor sends the detected vehicle speed information to the ECU 2. The internal sensor 4 may include an acceleration sensor and a yaw rate sensor. The internal sensor 4 may also include a steering touch sensor that detects the hands-off state in which the driver has removed the hands from the steering wheel.

The communication unit 5 carries out wireless communication between the host vehicle and a computer in the facilities such as the information management center. The communication unit 5 may carry out vehicle-vehicle communication between the host vehicle and the other vehicles. The communication unit 5 may also carry out road-vehicle communication between a roadside communication device (for example, optical beacon), provided on the road, and the host vehicle. The communication unit 5 sends the information, acquired via wireless communication, to the ECU 2. The host vehicle does not necessarily include the communication unit 5.

The navigation system 6 is a device that guides the driver of the host vehicle to the destination that is set by the driver of the host vehicle. The navigation system 6 includes a GPS reception unit 8 and a map information storage unit 9. The GPS reception unit 8 receives the signals from three or more GPS satellites to measure the position of the host vehicle (the longitude and the latitude of the host vehicle). The map information storage unit 9 is a database in which map information is stored. The map information storage unit 9 is included, for example, in the Hard Disk Drive (HDD) mounted on the host vehicle. The map information storage unit 9 stores the map information that includes the parking area information.

The navigation system 6 calculates a desired route, from the host vehicle's current position to the destination, based on the host vehicle's position information measured by the GPS reception unit 8 and the map information stored in the map information storage unit 9. The navigation system 6 sends the host vehicle position information, map information, and navigation information on the desired route to the ECU 2. The host vehicle does not necessarily include the navigation system 6.

The display unit 7 is a Head-Up Display (HUD) mounted on the host vehicle for projecting various information displays onto the windshield W. The display unit 7 may employ a known configuration of an HUD. The display unit 7 projects light onto the windshield W to form a virtual image (projection) on the windshield W for displaying various types of information in the driver's visual field. The display unit 7 displays the information on the windshield W based on the control signal from the ECU 2. The display unit 7 is configured to be able to change the display brightness based on the control signal from the ECU 2. In addition, the display unit 7 is configured to be able to change the size of the display area on the windshield W based on the control signal from the ECU 2. The display unit 7 may be a built-in HUD that is built in the dashboard of the host vehicle.

Next, the functional configuration of the ECU 2 is described. The function of the ECU 2 may be performed, in part, by a computer in the facilities such as the information management center with that can communicate with the host vehicle or by a mobile information terminal that can communicate with the host vehicle. The ECU 2 includes an object detection unit 10, a distance detection unit 11, a position information acquisition unit 12, a parking area determination unit 13, an area learning unit 14, and a display control unit 15.

The object detection unit 10 detects an object positioned ahead of the host vehicle based on the detection result of the external sensor 3. The object detection unit 10 detects an object, such as a preceding vehicle, using a known image processing method based on the information captured by the on-vehicle camera. The object detection unit 10 may detect an object using a known method based on the obstacle information detected by the radar.

When the object detection unit 10 detects an object, the distance detection unit 11 detects the distance between the host vehicle and the object based on the result detected by the external sensor 3. For example, the distance detection unit 11 detects the distance between the host vehicle and the object based on the obstacle information detected by the radar. When the on-vehicle camera is a stereo camera, the distance detection unit 11 may detect the distance between the host vehicle and the object based on the disparity image captured by the stereo camera.

The position information acquisition unit 12 acquires the host vehicle position information based on the result measured by the GPS reception unit 8 of the navigation system 6. The position information acquisition unit 12 may acquire the host vehicle position information via wireless communication carried out by the communication unit 5 (for example, via the road-vehicle communication with a roadside communication device). The position information acquisition unit 12 may increase the accuracy of the host vehicle position information by using not only the measurement result of the GPS reception unit 8 but also the detection result of the internal sensor 4 via a known method. The ECU 2 does not necessarily include the position information acquisition unit 12.

The parking area determination unit 13 determines whether the host vehicle is positioned in a parking area, based on the map information stored in the map information storage unit 9 of the navigation system 6 and on the host vehicle position information acquired by the position information acquisition unit 12. In addition, the parking area determination unit 13 may send the host vehicle position information to the information management center via the communication unit 5 to determine whether the host vehicle is positioned in a parking area, based on the determination information acquired by the information management center. The information management center accumulates therein various types of information sent from other vehicles capable of communicating with the information management center. In the information management center, the information on a new parking area is added to the map information based on the information received from other vehicles.

If the determination based on the map information stored in the map information storage unit 9 of the navigation system 6 is different from the result of determination based on the determination information from the information management center, the parking area determination unit 13 gives priority to the result of determination based on the map information of the navigation system 6. If it is determined that the host vehicle is positioned in a parking area based on the parking areas that the host vehicle has learned via the area learning unit 14 that will be described later, the parking area determination unit 13 gives priority to the result of determination based on the parking areas that the host vehicle has learned even if the determination result based on the map information of the navigation system 6 or on the determination information from the information management center indicates that the host vehicle is not in a parking area. The ECU 2 does not necessarily include the parking area determination unit 13.

The area learning unit 14 adds a parking area to the map information in the map information storage unit 9 under the condition that is set in advance. The area learning unit 14 determines whether the host vehicle is positioned on a road based on the host vehicle position information and the map information. If it is determined that the host vehicle is position on a road, the area learning unit 14 does not learn parking areas. If it is determined that the host vehicle is not positioned on a road, the area learning unit 14 determines whether the vehicle speed of the host vehicle is equal to or lower than the learning vehicle-speed threshold and whether the distance between the host vehicle and an object is equal to or smaller than the learning distance threshold. The learning vehicle-speed threshold and the learning distance threshold are thresholds for determining whether the area is to be learned as a parking area. The learning vehicle-speed threshold and the learning distance threshold may be a fixed value or a variable value. For example, the learning vehicle-speed threshold may be set to 10 km/h, and the learning distance threshold may be set to 10 m.

If it is determined that the host vehicle is not positioned on a road and if it is determined that the vehicle speed of the host vehicle is equal to or lower than the learning vehicle-speed threshold and that the distance between the host vehicle and the object is equal to or smaller than the learning distance threshold, the area learning unit 14 learns the area, which includes the host vehicle position where the determination is made, as a parking area. For example, the area learning unit 14 learns the area, which is within the circle of radius of 50 m centered on the host vehicle position where the determination is made, as a parking area. The area learning unit 14 references the map information and, if the host vehicle's position where the determination is made is an open place, the area learning unit 14 may learn the open place as a parking area. The ECU 2 does not necessarily include the area learning unit 14.

The display control unit 15 controls the display unit 7. The display control unit 15 uses a known method to determine the information display contents based the information obtained from at least one of the external sensor 3, internal sensor 4, communication unit 5, navigation system 6, object detection unit 10, distance detection unit 11, position information acquisition unit 12, parking area determination unit 13, and driving assistance device. The display control unit 15 determines the display contents from the display patterns, which have been stored in advance, based on the obtained information. For example, if the object detection unit 10 detects an object, the display control unit 15 sends the control signal to the display unit 7 to display the object information on the windshield W. The display contents of the object information are, for example, the preceding-vehicle display 52 and the preceding-vehicle tracking control display 53 shown in FIG. 2. If the object detection unit 10 does not detect an object anymore, the display control unit 15 sends the control signal to the display unit 7 to stop the object information display.

The display control unit 15 changes the display mode of the information on the windshield W via the display unit 7. If the parking area determination unit 13 determines that the host vehicle is positioned in a parking area, the display control unit 15 determines whether the distance between the host vehicle and the object is smaller than the first threshold based on the detection result of the distance detection unit 11. If it is determined that the distance between the host vehicle and the object is smaller than the first threshold, the display control unit 15 reduces the display brightness or the display area of the object information as compared to when the distance between the host vehicle and the object is equal to or larger than the first threshold (see FIG. 3B and FIG. 3C). The display control unit 15 may reduce both the display brightness and the display area of the object information.

If the first threshold is not used and if it is determined by the parking area determination unit 13 that the host vehicle is positioned in a parking area, the display control unit 15 continuously reduces the display brightness or the display area of the object information as the distance between the host vehicle and the object becomes smaller. The display control unit 15 may continuously reduce both the brightness and the display area of the object information display.

If it is once determined that the distance between the host vehicle and the object is smaller than the first threshold and the display brightness is reduced and, after that, if it is determined that the distance between the host vehicle and the object becomes equal to or larger than the first threshold, the display control unit 15 restores the display brightness to the original level. On the other hand, if the display brightness is continuously reduced as the distance between the host vehicle and the object becomes smaller, the display control unit 15 increases the display brightness as the distance between the host vehicle and the object becomes larger. The size of the display area is changed similarly. The display control unit 15 does not increase the display brightness beyond the original level, and the display area of the display beyond the original size. If the parking area determination unit 13 determines that the host vehicle is not positioned in a parking area, the display control unit 15 restores the display brightness to the original level, and the display area to the original size.

The display control unit 15 may change the display mode of not only the object information display but also all displays projected on the windshield W according to the distance between the host vehicle and the object. For example, the display control unit 15 reduces the display brightness or the display area in stages according to the distance between the host vehicle and the object. More specifically, if it is determined that the distance between the host vehicle and the object is smaller than the first threshold, the display control unit 15 reduces the display brightness or the display area of all displays projected on the windshield W as compared to when the distance between the host vehicle and the object is equal to larger than the first threshold. The display control unit 15 may continuously reduce the display brightness or the display area according to the distance between the host vehicle and the object. In this case, the display control unit 15 continuously reduces the display brightness or the display area of all displays projected on the windshield W as the distance between the host vehicle and the object becomes smaller. The display control unit 15 restores the level of the display brightness, or the size of the display area, in the same manner. Instead of changing the display mode of all displays, the display control unit 15 may change the display mode of the display, included in a range that is set in advance on the windshield W (for example, the range in front of the driver's seat), according to the distance between the host vehicle and the object. The object information display is included in the range that is set in advance.

In addition, if the parking area determination unit 13 determines that the host vehicle is positioned in a parking area, the display control unit 15 determines whether the distance between the host vehicle and the object is smaller than the second threshold based on the detection result of the distance detection unit 11. In the description below, only the determination based on the second threshold is described. In the case when the display brightness or the display area is continuously reduced according to the distance between the host vehicle and the object (that is, when the first threshold is not used), the display control unit 15 makes the determination using, not the second threshold, but the third threshold. Therefore, in the description below, the third threshold should be used instead of the second threshold when the display brightness or the display area is continuously reduced according to the distance between the host vehicle and the object.

If it is determined that the distance between the host vehicle and the object is smaller than the second threshold, the display control unit 15 stops the object information display. If it is once determined that the distance between the host vehicle and the object is smaller than the second threshold and the object information display is stopped and, after that, if it is determined that the distance between the host vehicle and the object is equal to or larger than the second threshold, the display control unit 15 redisplays the object information. The display control unit 15 redisplays the object information using the display brightness or the display area according to the distance between the host vehicle and the object. The display control unit 15 redisplays the object information also if the parking area determination unit 13 determines that the host vehicle is not positioned in a parking area anymore. The object information need not necessarily be redisplayed.

In addition, if the parking area determination unit 13 determines that the host vehicle is positioned in a parking area and if the vehicle speed of the host vehicle is lower than a fourth threshold, the display control unit 15 may change the display mode or stop the display according to the distance between the host vehicle and the object. The fourth threshold is a value, which is set appropriately in advance, considering that the speed of the host vehicle is reduced when the driver confirms the surroundings in a parking area. The fourth threshold may be a fixed value or a value that varies according to the situation. If the vehicle speed of the host vehicle is lower than the fourth threshold, the display control unit 15 may change the display mode or stop the display according to the distance between the host vehicle and the object regardless of the determination result of the parking area determination unit 13.

The display control unit 15 need not necessarily change the display mode or stop the display only when the host vehicle is positioned in a parking area. The display control unit 15 may change the display mode or stop the display based on the distance between the host vehicle and the object regardless of the determination result of the parking area determination unit 13.

If it is determined that the distance between the host vehicle and the object is smaller than the second threshold, the display control unit 15 may stop the display of not only the object information but also all displays projected on the windshield W. The display control unit 15 may redisplay the display in the same manner. If it is determined that the distance between the host vehicle and the object is smaller than the second threshold, the display control unit 15 may change the display mode of the display included in the range on the windshield that is set in advance W (for example, the range in front of the driver's seat). The range that is set in advance includes the object information display.

Figure 4:
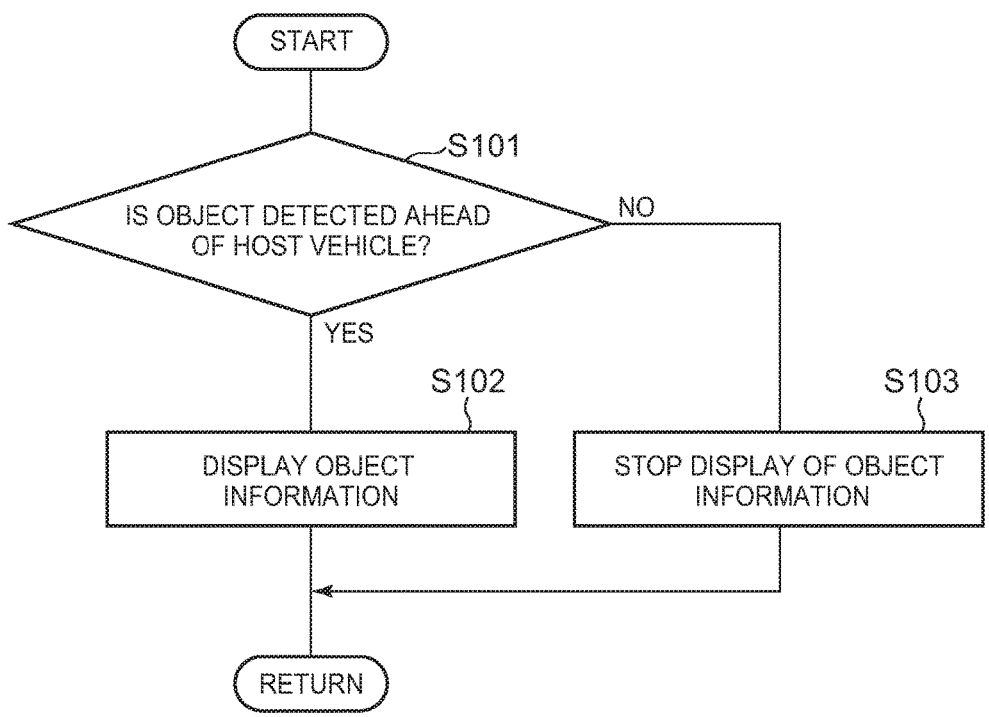
FIG. 4 is a flowchart showing the display control of object information.

<Display control of the display device in the first embodiment> Next, the display control of the display device 1 in the first embodiment is described. FIG. 4 is a flowchart showing the display control of the display device 1 in the first embodiment. The processing of the flowchart shown in FIG. 4 is started by the ECU 2 when the host vehicle starts ACC. When the processing of the flowchart shown in FIG. 4 reaches RETURN, the ECU 2 repeats the processing again beginning at START. When the host vehicle stops ACC, the ECU 2 terminates the processing of the flowchart shown in FIG. 4 even if the processing is not yet completed. The ECU 2 may display the object information regardless of whether driving assistance such as ACC is performed.

As shown in FIG. 4, in step S101, the ECU 2 of the display device 1 uses the object detection unit 10 to detect whether an object is positioned ahead of the host vehicle. The object detection unit 10 detects an object, for example, based on the detection result of the external sensor 3. If it is detected that an object is detected (S101: YES), the ECU 2 proceeds to step S102. If it is determined that an object is not detected (S101: NO), the ECU 2 proceeds to step S103.

In step S102, the ECU 2 causes the display control unit 15 to display the object information. The display control unit 15 sends the control signal, which displays the object information, to the display unit 7 to display the object information on the windshield W of the host vehicle. If the object information is already displayed, the display control unit 15 continues the display. After that, the ECU 2 terminates the current display control and, after a pre-set time elapses, repeats the processing again beginning in step S101.

In step S103, the ECU 2 stops the display if the object information is displayed using the display control unit 15. The display control unit 15 stops the sending of the control signal, which displays the object information, to the display unit 7 to stop the display. If the object information is not displayed, the display control unit 15 maintains the current state. After that, the ECU 2 terminates the current display control and, after a pre-set time elapses, repeats the processing again beginning in step S101.

Figure 5:
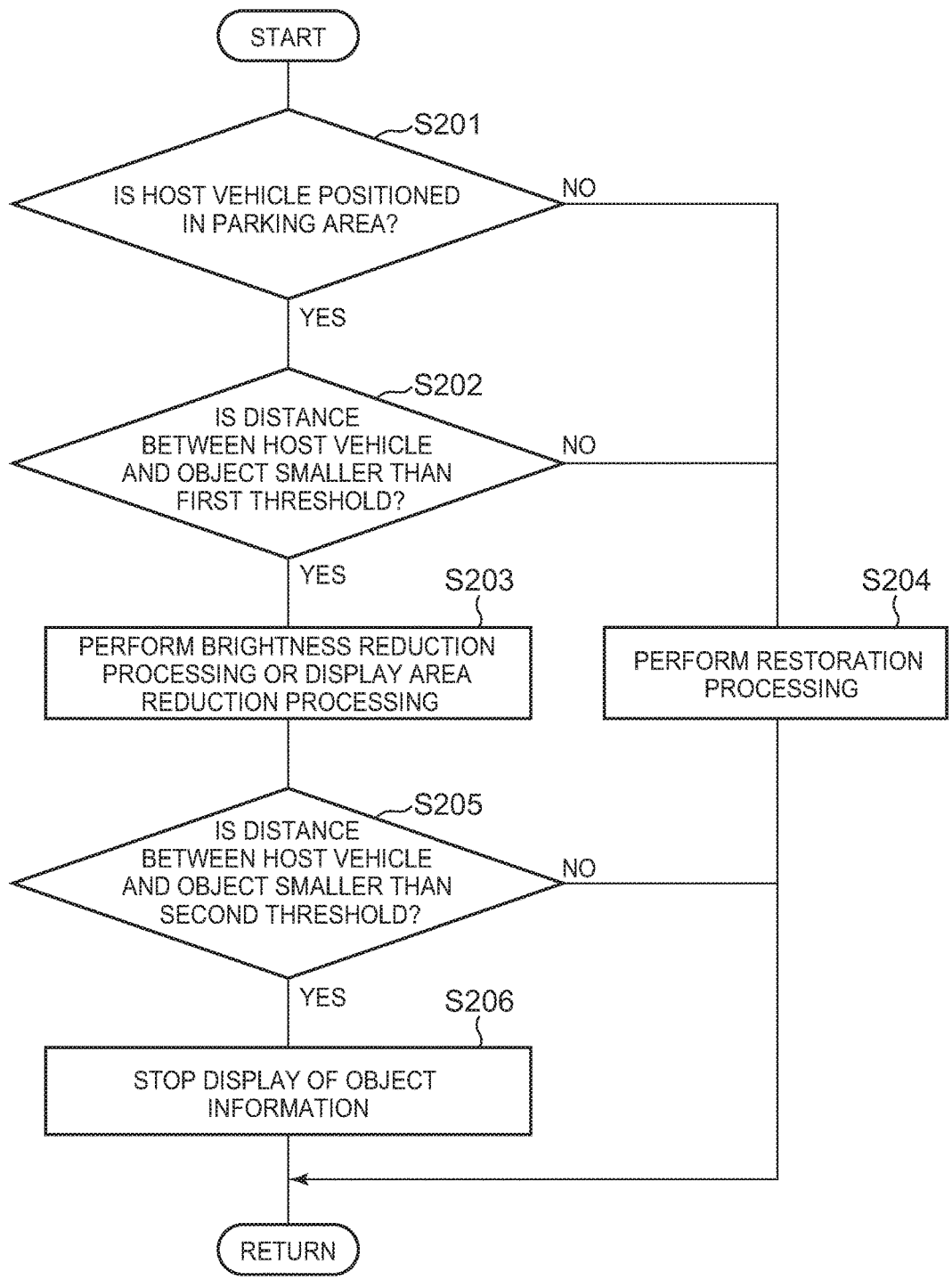
FIG. 5 is a flowchart showing the display change control of object information.

<Display change control of the display device in the first embodiment> Next, the display change control of the display device 1 in the first embodiment is described below. FIG. 5 is a flowchart showing the display change control of the display device 1 in the first embodiment. The processing of the flowchart shown in FIG. 5 is started by the ECU 2 when the object information is displayed on the windshield W. When the processing of the flowchart shown in FIG. 5 reaches RETURN, the ECU 2 repeats the processing again beginning at START. If the display of the object information is stopped in step S103 shown in FIG. 4 (if the display of the object information is stopped because no object is detected anymore), the ECU 2 terminates the processing of the flowchart shown in FIG. 5 even if the processing is not yet completed.

As shown in FIG. 5, in step S201, the ECU 2 of the display device 1 uses the parking area determination unit 13 to determine whether the host vehicle is positioned in a parking area. The parking area determination unit 13 determines whether the vehicle is positioned in a parking area based on the map information stored in the map information storage unit 9 of the navigation system 6 and the host vehicle's position information acquired by the position information acquisition unit 12. If it is determined that the host vehicle is positioned in a parking area (S201: YES), the ECU 2 proceeds to step S202. If it is determined that the host vehicle is not positioned in a parking area (S201: NO), the ECU 2 proceeds to step S204.

In step S202, the ECU 2 uses the display control unit 15 to determine whether the distance between the host vehicle and the object is smaller than the first threshold. The display control unit 15 determines whether the distance between the host vehicle and the object is smaller than the first threshold based on the detection result of the distance detection unit 11. If it is determined that the distance between the host vehicle and the object is smaller than the first threshold (S202: YES), the ECU 2 proceeds to step S203. If it is determined that the distance between the host vehicle and the object is equal to or larger than the first threshold (S202: NO), the ECU 2 proceeds to step S204.

In step S203, the ECU 2 uses the display control unit 15 to perform the brightness reduction processing or the display area reduction processing. The brightness reduction processing refers to the processing for reducing the display brightness of the object information. The display area reduction processing refers to the processing for reducing the object information display area on the windshield W. After performing the brightness reduction processing or the display area reduction processing, the ECU 2 proceeds to step S205. If the display brightness or the display area of the object information is already reduced by the brightness reduction processing or the display area reduction processing, the ECU 2 maintains the current status and proceeds to step S205 without performing the brightness reduction processing or the display area reduction processing anymore.

In step S204, the ECU 2 uses the display control unit 15 to perform the restoration processing. The restoration processing refers to the processing for restoring the display brightness to the original level, or the display area to the original size, if the display brightness or the display area of the object information is reduced by the brightness reduction processing or the display area reduction processing. After performing the restoration processing, the ECU 2 terminates the current processing. If the display brightness or the display area of the object information is not reduced, the ECU 2 terminates the current processing without performing the restoration processing. After that, after a pre-set time elapses, the ECU 2 repeats the processing again beginning in step S201.

In step S205, the ECU 2 uses the display control unit 15 to determine whether the distance between the host vehicle and the object is smaller than the second threshold. The display control unit 15 determines whether the distance between the host vehicle and the object is smaller than the second threshold based on the detection result of the distance detection unit 11. If it is determined that the distance between the host vehicle and the object is smaller than the second threshold (S205: YES), the ECU 2 proceeds to step S206. If it is determined that the distance between the host vehicle and the object is equal to or larger than the second threshold (S205: NO), the ECU 2 terminates the current display change control and, after a pre-set time elapses, repeats the processing again beginning in step S201.

In step S206, the ECU 2 uses the display control unit 15 to stop the display of the object information. When the display of the object information is stopped, the ECU 2 performs the redisplay processing that will be described later. While the display of the object information is stopped, the ECU 2 does not perform the display change control shown in FIG. 5.

Instead of step S202 and step S203, the ECU 2 may perform the processing in which the display brightness or the display area of the object information is continuously reduced as the distance between the host vehicle and the object becomes smaller. In this case, instead of the restoration processing in step S204, the ECU 2 performs the processing in which the display brightness or the display area of the object information is continuously increased as the distance between the host vehicle and the object becomes larger. The ECU 2 does not necessarily perform the determination in step S201. The flowchart shown in FIG. 5 may be a flowchart in which the determination in step S201 is omitted and the processing is started from step S202.

Figure 6:
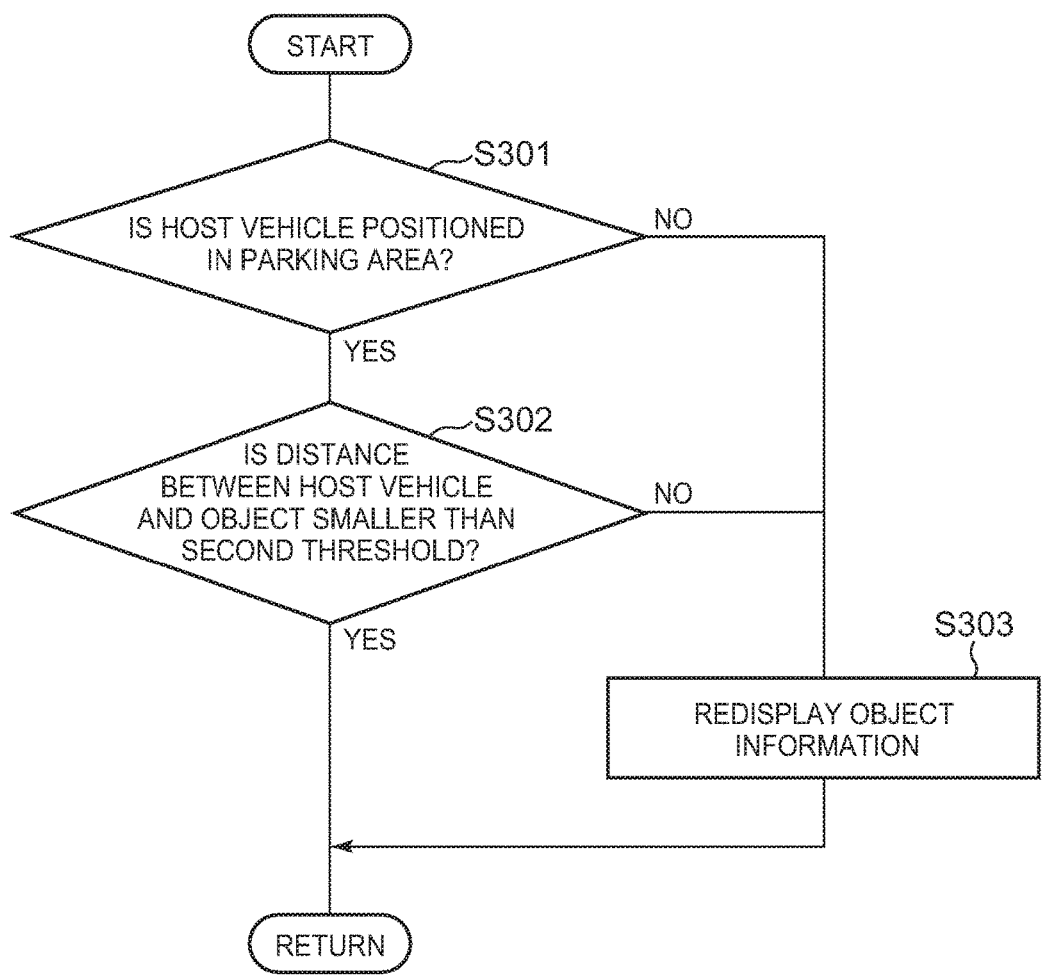
FIG. 6 is a flowchart showing the redisplay control of object information.

<Redisplay control of the display device in the first embodiment> Next, the redisplay control of the display device 1 in the first embodiment is described below. FIG. 6 is a flowchart showing the redisplay control of the display device 1 in the first embodiment. The processing of the flowchart shown in FIG. 6 is started by the ECU 2 when the display of the object information is stopped in step S206 in FIG. 5. When the processing of the flowchart shown in FIG. 6 reaches RETURN, the ECU 2 repeats the processing again beginning at START. When the display of the object information is stopped in step S103 shown in FIG. 4, the ECU 2 terminates the processing of the flowchart shown in FIG. 6 even if the processing is not yet completed.

As shown in FIG. 6, in step S301, the ECU 2 of the display device 1 uses the parking area determination unit 13 to determine whether the host vehicle is positioned in a parking area. If it is determined that the host vehicle is positioned in a parking area (S301: YES), the ECU 2 proceeds to step S302. If it is determined that the host vehicle is not positioned in a parking area (S301: NO), the ECU 2 proceeds to step S303.

In step S302, the ECU 2 uses the display control unit 15 to determine whether the distance between the host vehicle and the object is smaller than the second threshold. If it is determined that the distance between the host vehicle and the object is smaller than the second threshold (S302: YES), the ECU 2 terminates the current redisplay control. After that, after a pre-set time elapses, the ECU 2 repeats the processing again beginning in step S301. If it is determined that the distance between the host vehicle and the object is equal to or larger than the second threshold (S302: NO), the ECU 2 proceeds to step S303.

In step S303, the ECU 2 uses the display control unit 15 to redisplay the object information. The display control unit 15 redisplays the object information on the windshield W so that the brightness becomes the level, or the display area becomes the size, according to the current distance between the host vehicle and the object. After redisplaying the object information, the ECU 2 terminates the redisplay control shown in FIG. 6. After that, the ECU 2 performs the display change control, shown in FIG. 5, again.

<Effect of the display device 1 in the first embodiment>
According to the display device 1 in the first embodiment described above, the display brightness or the display area of the object information on the windshield W is reduced as the distance between the host vehicle and the object becomes smaller. When the distance between the host vehicle and the object becomes smaller than the second threshold or the third threshold, the display device 1 stops the display of the information on the object. Therefore, when the driver directly and visually recognizes the object as the distance between the host vehicle and the object becomes smaller, this display device 1 reduces the possibility that the display on the windshield W obstructs the driver's visual field, thus reducing the possibility that the display obstructs the driver from visually recognizing the object. As a result, this display device 1 reduces the situation in which the driver feels annoyed about the object information display on the windshield W.

In addition, if the parking area determination unit 13 determines that the host vehicle is positioned in a parking area, this display device 1 may change the display mode or stop the display according to the distance between the host vehicle and the object. In this case, because the driver must confirm the situation around the vehicle more carefully when the vehicle is positioned in a parking area than when the vehicle is positioned on a road, it is necessary to avoid that the object information display on the windshield W obstructs the driver from confirming the situation around the vehicle. To do so, the display device 1 reduces the display brightness or the display area of the information on the objects near to the host vehicle and, in some cases, stops the display of the information on the objects near to the host vehicle. This reduces the possibility that the display obstructs the driver from visually recognizing the surrounding objects.

Figure 7:
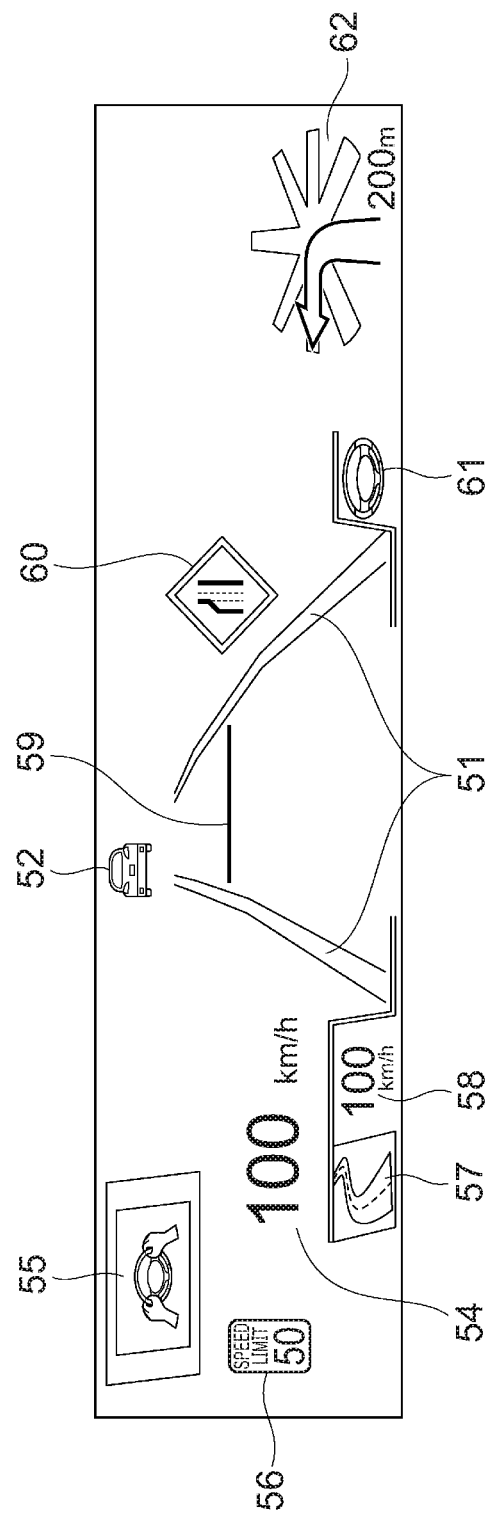
FIG. 7 is a diagram showing an example of displays other than object information display.

<Display of information other than object information>
FIG. 7 is a diagram showing an example of displays other than the object information display. The displays shown in FIG. 7 are projected on the windshield W in front of the driver's seat and in the bottom half of the windshield W. In addition to the white-line display 51 and the preceding-vehicle display 52, FIG. 7 shows a host vehicle's current speed 54, a driver's hands-off driving warning display 55, a legal minimum speed display 56, a curve deceleration-control operation display 57, an ACC vehicle-speed setting display 58, an ACC inter-vehicular time setting display 59, a driving-assistance-control stop point display 60, an LTC operation display 61, and a route guidance display 62.

The host vehicle's current speed 54 is displayed while the host vehicle travels. The driver's hands-off driving warning display 55 is displayed when the driver's hands-off driving state is detected. The legal minimum speed display 56 is displayed while the host vehicle travels on an expressway (a road for exclusive use of vehicles). The legal maximum speed may also be displayed. The curve deceleration-control operation display 57 is displayed while the host vehicle uses the curve deceleration control as a driving assistance. The ACC vehicle-speed setting display 58 and the ACC inter-vehicular time setting display 59 are displayed while the host vehicle uses ACC as a driving assistance. The driving-assistance-control stop point display 60 is displayed when a position, where a driving assistance such as LTC cannot be continued, is detected ahead of the host vehicle. FIG. 7 shows the driving-assistance-control stop point display 60 indicating that a lane reduction point is approaching. The LTC operation display 61 is displayed while the host vehicle uses LTC as a driving assistance. The route guidance display 62 is displayed when the host vehicle travels on a route suggested by the route guidance of the navigation system 6.

The display control unit 15 may change the display mode, or stop the display, of the displays 54 to 62 shown in FIG. 7 according to the distance between the host vehicle and the object in the same manner as for the object information display described above. The display control unit 15 may change the display mode or stop the display, not for all but for some of the displays 54-62 shown in FIG. 7, according to the distance between the host vehicle and the object.

Figure 8:
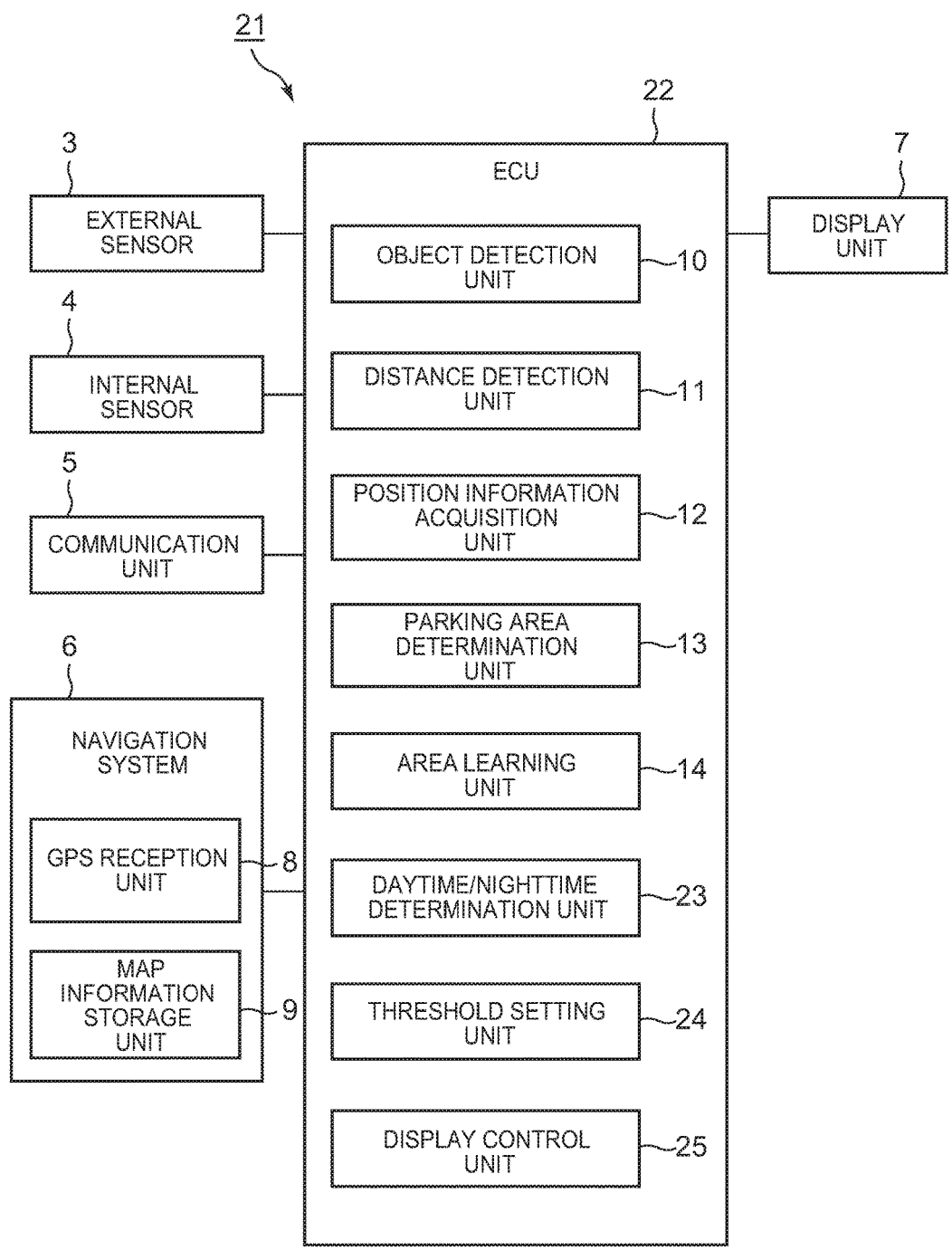
FIG. 8 is a block diagram showing a display device in a second embodiment.

[Second embodiment] Next, a display device 21 in a second embodiment is described below with reference to the drawings. FIG. 8 is a block diagram showing the display device 21 in the second embodiment. In the description below, the same reference numeral is used for the same configuration as that in the first embodiment and the duplicated description is omitted.

As shown in FIG. 8, the display device 21 in the second embodiment differs from the display device 1 in the first embodiment in that the display device 21 includes a daytime/nighttime determination unit 23 and a threshold setting unit 24 and that a display control unit 25 has an additional function.

More specifically, an ECU 22 of the display device 21 in the second embodiment includes the daytime/nighttime determination unit 23 and the threshold setting unit 24. The daytime/nighttime determination unit 23 determines whether it is daytime or nighttime outside the host vehicle. When the host vehicle has an illumination sensor, the daytime/nighttime determination unit 23 determines whether it is daytime or nighttime based on the illumination around the host vehicle. The daytime/nighttime determination unit 23 determines that it is daytime if the illumination around the host vehicle is equal to or higher than the threshold and that it is nighttime if the illumination is lower than the threshold. The daytime/nighttime determination unit 23 may also determine that it is nighttime if the headlights of the host vehicle are turned on.

The daytime/nighttime determination unit 23 may determine whether it is daytime or nighttime based on the timer of the host vehicle. In this case, it is desirable that the daytime/nighttime determination unit 23 determine whether it is daytime or nighttime considering the host vehicle's position information (longitude and latitude) and the season. The daytime/nighttime determination unit 23 may determine that it is nighttime outside the host vehicle if it is determined to be raining. The daytime/nighttime determination unit 23 determines that it is raining when the host vehicle's windshield wiper is switched on.

The threshold setting unit 24 sets the first threshold to a larger value when the daytime/nighttime determination unit 23 determines that it is nighttime outside the host vehicle than when the daytime/nighttime determination unit 23 determines that it is daytime. In addition, the threshold setting unit 24 sets the second threshold to a larger when the daytime/nighttime determination unit 23 determines that it is nighttime outside the host vehicle than when the daytime/nighttime determination unit 23 determines that it is daytime.

Figure 9:
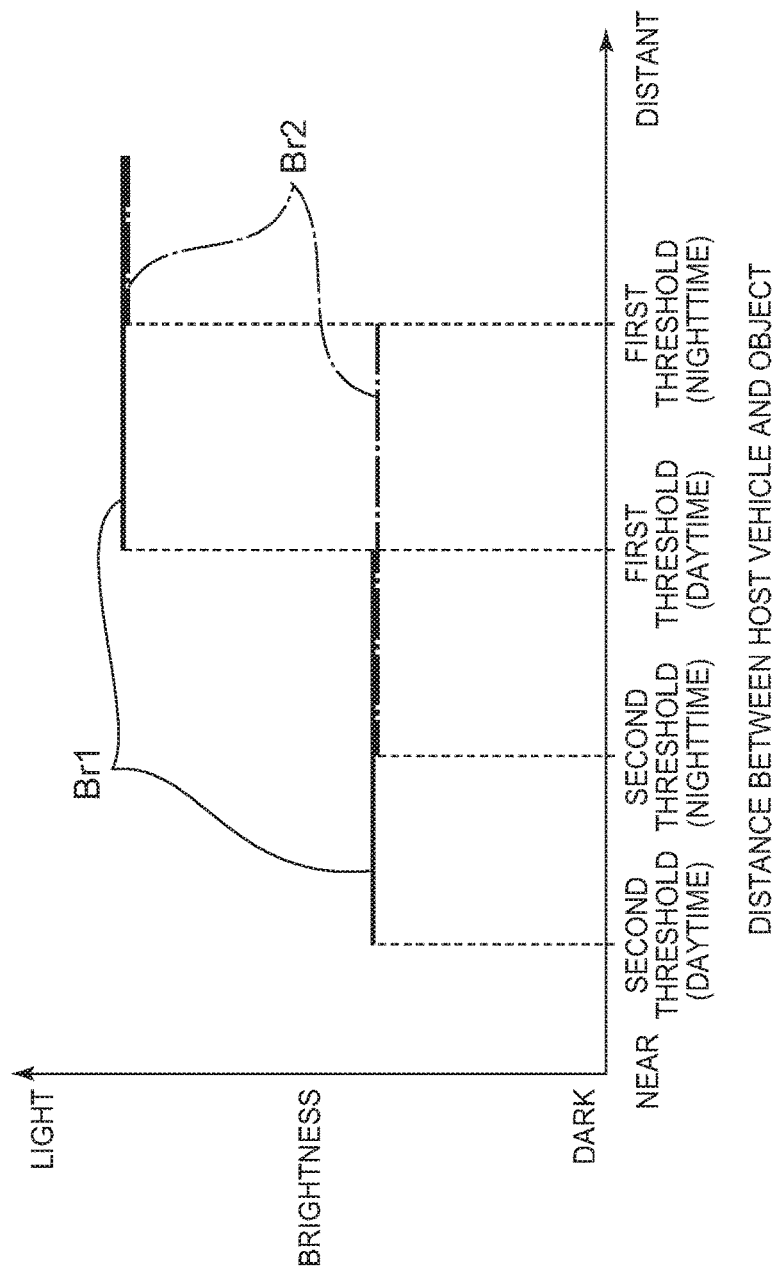
FIG. 9 is a graph showing a change in the first threshold and the second threshold when the display brightness is changed in stages according to the distance between the host vehicle and an object.

FIG. 9 is a graph showing a change in the first threshold and the second threshold when the display brightness is changed in stages according to the distance between the vehicle and an object. The vertical axis in FIG. 9 is the display brightness. The horizontal axis is the distance between the host vehicle and the object. In FIG. 9, the solid line indicates Br1 that is the display brightness when the daytime/nighttime determination unit 23 determines that it is daytime outside the host vehicle. The dashed line indicates Br2 that is the display brightness when the daytime/nighttime determination unit 23 determines that it is nighttime outside the host vehicle. The "first threshold (daytime)" is the first threshold when it is determined to be daytime. The "second threshold (daytime)" is the second threshold when it is determined to be daytime. The "first threshold (nighttime)" is the first threshold when it is determined to be nighttime. The "second threshold (nighttime)" is the second threshold when it is determined to be nighttime.

As shown in FIG. 9, the brightness Br1 is lower when the distance between the host vehicle and the object is smaller than the first threshold (daytime) than when the distance is equal to or larger than the first threshold (daytime). When the distance between the host vehicle and the object is smaller than the second threshold (daytime), there is no brightness Br1 because the display is stopped. Similarly, the brightness Br2 is lower when the distance between the host vehicle and the object is smaller than the first threshold (nighttime) than when the distance is equal to or larger than the first threshold (nighttime). When the distance between the host vehicle and the object is smaller than the second threshold (nighttime), there is no brightness Br2 because the display is stopped. In FIG. 9, when the distance between the host vehicle and the object is equal to or larger than the first threshold (nighttime), the brightness Br1 and the br2 are the same value. Similarly, when the distance between the host vehicle and the object is smaller than the first threshold (daytime) and is equal to or larger than the second threshold (nighttime), the brightness Br1 and the Br2 are the same value.

As shown in FIG. 9, the threshold setting unit 24 sets the first threshold (nighttime) and the second threshold (nighttime), used when it is determined to be nighttime, larger than the first threshold (daytime) and the second threshold (daytime) used when it is determined to be daytime. In this manner, the display device 21 sets the first threshold larger when it is determined to be nighttime than when it is determined to be daytime, making it possible to reduce the display brightness sooner according to the distance between the host vehicle and the object. In addition, the display device 21 sets the second threshold larger when it is determined to be nighttime than when it is determined to be daytime, making it possible to stop the display sooner according to the distance between the host vehicle and the object. The vertical axis, though used to indicate the display brightness in FIG. 9, may be used to indicate the area of the display area. That is, the relation shown in FIG. 9 is applicable also to the display area. The threshold setting unit 24 may change, not both, but only one of the first threshold and the second threshold.

On the other hand, when the display control unit 15 continuously reduces the display brightness or the display area according to the distance between the host vehicle and the object (when the first threshold and second threshold are not used), the threshold setting unit 24 sets the third threshold larger instead of the first threshold and the second threshold.

Figure 10:
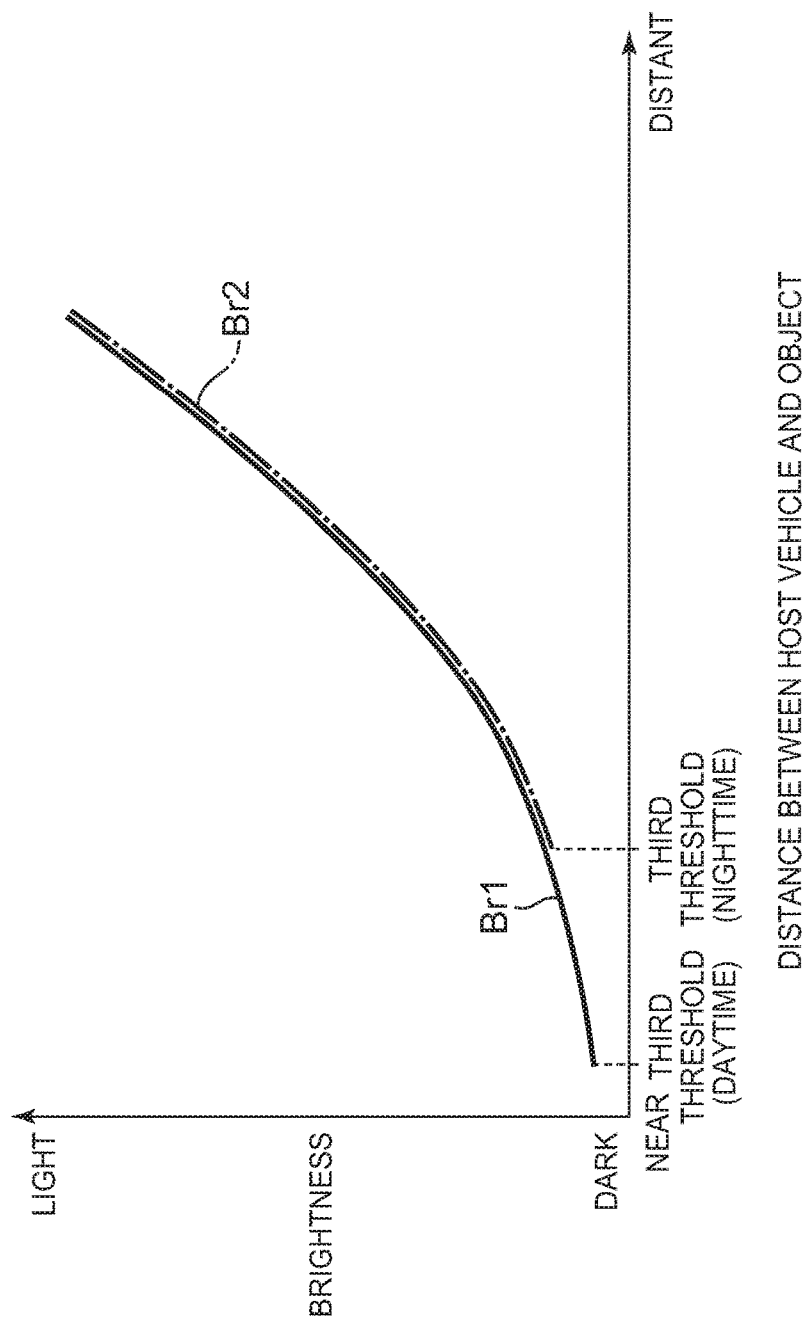
FIG. 10 is a graph showing a change in the third threshold when the display brightness is changed continuously according to the distance between the host vehicle and an object.

FIG. 10 is a graph showing a change in the third threshold when the display brightness is changed continuously according to the distance between the host vehicle and an object. The vertical axis and the horizontal axis in FIG. 10 are the same as those in FIG. 9. In FIG. 10, Br1 is the brightness when it is determined to be daytime, and Br2 is the brightness when it is determined to be nighttime, as in FIG. 9. The "third threshold (daytime)" is the third threshold when it is determined to be daytime. The "third threshold (nighttime)" is the third threshold when it is determined to be nighttime.

As shown in FIG. 10, the smaller the distance between the host vehicle and the object is, the smaller the values of the brightness Br1 and brightness Br2 are. When the distance between the host vehicle and the object is smaller than the third threshold (daytime), there is no brightness Br1 because the display is stopped. Similarly, when the distance between the host vehicle and the object is smaller than the third threshold (nighttime), there is no brightness Br2 because the display is stopped.

In addition, as shown in FIG. 10, the threshold setting unit 24 sets the third threshold (nighttime), used when it is determined to be nighttime, larger than the third threshold (daytime) used when it is determined to be daytime. In this manner, the display device 21 sets the third threshold larger when it is determined to be nighttime than when it is determined to be daytime, making it possible to stop the display sooner according to the distance between the host vehicle and the object. The vertical axis, though used to indicate the display brightness in FIG. 10, may be used to indicate the area of the display area. In addition, the ECU 22 in the second embodiment need not necessarily include the threshold setting unit 24.

The display control unit 25 has the function similar to that of the display control unit 15 in the first embodiment. For example, if the parking area determination unit 13 determines that the host vehicle is positioned in a parking area, the display control unit 25 determines whether the distance between the host vehicle and the object is smaller than the first threshold based on the detection result of the distance detection unit 11. If it is determined that the distance between the host vehicle and the object is smaller than the first threshold, the display control unit 25 reduces the display brightness or the display area of the object information. The display control unit 25 may reduce both the display brightness and the display area of the object information.

In addition, if the parking area determination unit 13 determines that the host vehicle is positioned in a parking area, the display control unit 25 determines whether the distance between the host vehicle and the object is smaller than the second threshold based on the detection result of the distance detection unit 11. If it is determined that the distance between the host vehicle and the object is smaller than the second threshold, the display control unit 25 stops the object information display.

In addition, the display control unit 25 has an additional function. That is, if the parking area determination unit 13 determines that the host vehicle is positioned in a parking area and if the daytime/nighttime determination unit 23 determines that it is nighttime outside the host vehicle, the display control unit 25 reduces the display brightness or the display area of the object information as compared to when the daytime/nighttime determination unit 23 determines that it is daytime.

Figure 11:
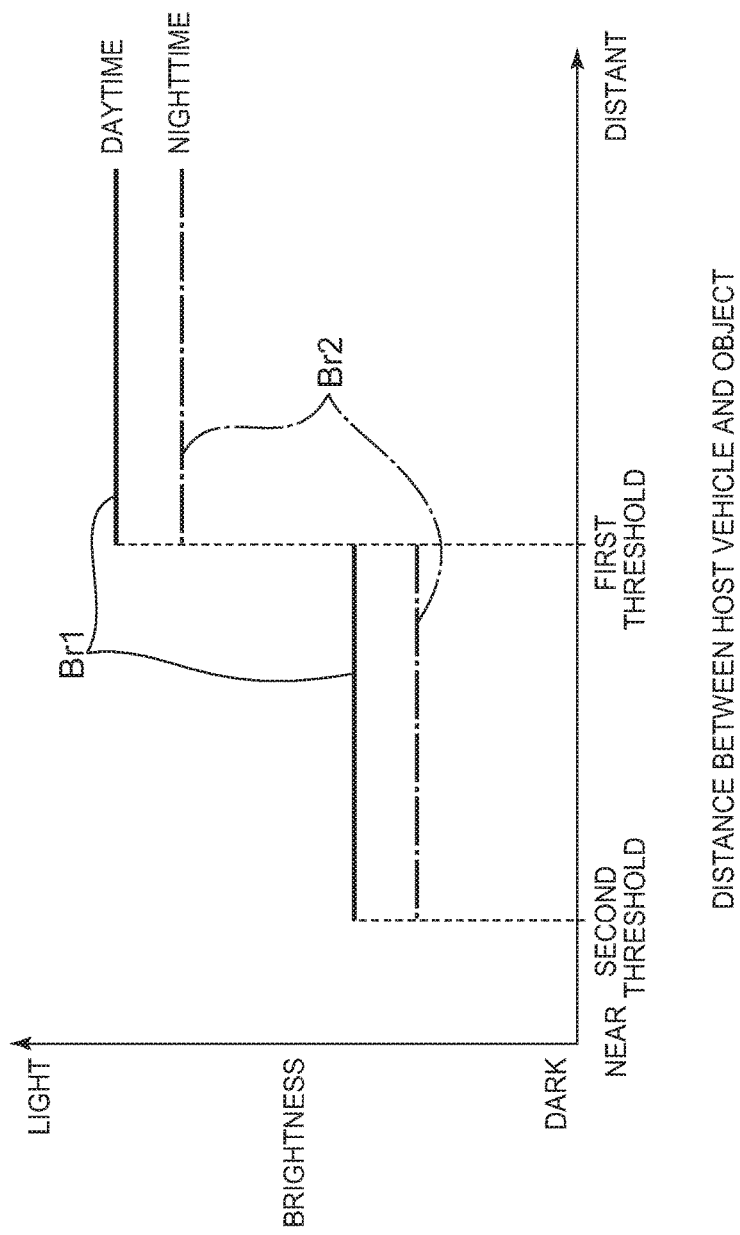
FIG. 11 is a graph showing a change in brightness in the daytime and nighttime when the display brightness is changed in stages according to the distance between the host vehicle and an object.

FIG. 11 is a graph showing a change in brightness in the daytime and nighttime when the display brightness is changed in stages according to the distance between the host vehicle and an object. The vertical axis and the horizontal axis in FIG. 11 are the same as those in FIG. 9. In FIG. 11, Br1 is the brightness when it is determined to be daytime, and Br2 is the brightness when it is determined to be nighttime, as in FIG. 9. The example in FIG. 11 shows the case in which the first threshold and the second threshold are not changed according to the result of determination whether it is daytime or nighttime.

As shown in FIG. 11, when the daytime/nighttime determination unit 23 determines that it is nighttime outside the host vehicle, the display control unit 25 may reduce the display brightness of the object information as compared to when the daytime/nighttime determination unit 23 determines that it is daytime. In other words, the display control unit 25 sets the brightness Br2, which is the brightness when it is determined to be nighttime, lower than the brightness Br1 which is the brightness when it is determined to be daytime. The display control unit 25 may be configured in such a manner that the brightness Br1 for daytime and the brightness Br2 for the nighttime, which are set in advance, are switched according to the determination result of the daytime/nighttime determination unit 23.

Figure 12:
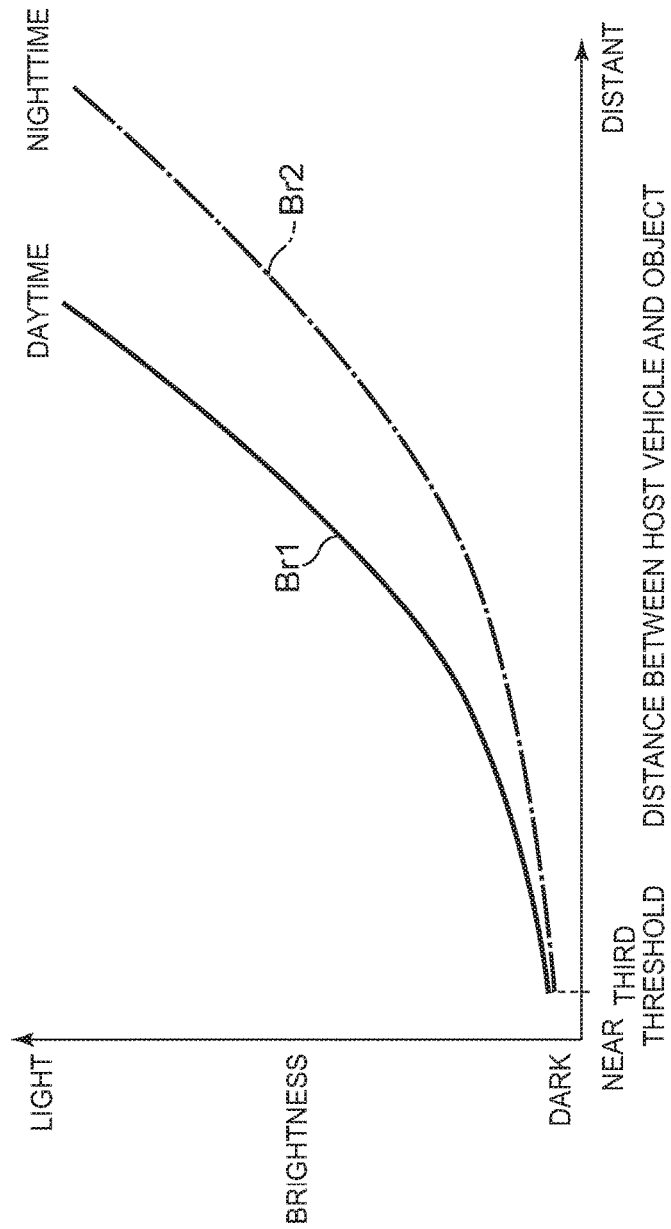
FIG. 12 is a graph showing a change in brightness in the daytime and nighttime when the display brightness is changed continuously according to the distance between the host vehicle and an object.

FIG. 12 is a graph showing a change in brightness in the daytime and nighttime when the display brightness is changed continuously according to the distance between the host vehicle and an object. The vertical axis and the horizontal axis in FIG. 12 are the same as those in FIG. 9. In FIG. 12, Br1 is the brightness when it is determined to be daytime, and Br2 is the brightness when it is determined to be nighttime, as in FIG. 9. The example in FIG. 12 shows the case in which the third threshold is not changed according to the result of determination whether it is daytime or nighttime.

As shown in FIG. 12, when the daytime/nighttime determination unit 23 determines that it is nighttime outside the host vehicle, the display control unit 25 may reduce the display brightness of the object information as compared to when the daytime/nighttime determination unit 23 determines that it is daytime. In other words, the display control unit 25 sets the brightness Br2, which is the brightness when it is determined to be nighttime, lower than the brightness Br1 which is the brightness when it is determined to be daytime. As shown in FIG. 12, the display control unit 25 may change the brightness change rate with respect to the change in the distance between the host vehicle and the object according to whether it is daytime and nighttime.

The vertical axis, though used to indicate the display brightness in FIG. 11 and FIG. 12, may be used to indicate the area of the display area. The display device 21 may use the threshold setting unit 24 to change the first threshold or the second threshold according to the result of determination whether it is daytime or nighttime and, in addition, may use the display control unit 25 to change the display brightness (or area of the display area) according to the result of determination whether it is daytime or nighttime. For example, the display device 21 changes the first threshold or the second threshold according to the result of determination whether it is daytime or nighttime as shown in FIG. 9 and, in addition, changes the display brightness (or the area of the display area) according to the result of determination whether it is daytime or nighttime as shown in FIG. 11. Similarly, the display device 21 changes the third threshold according to the result of determination whether it is daytime or nighttime as shown in FIG. 10 and, in addition, changes the display brightness (or the area of the display area) according to the result of determination whether it is daytime or nighttime as shown in FIG. 12. On the other hand, the display device 21 need not necessarily include the additional function of the display control unit 25 described above. The display device 21 may include only one of the additional function of the display control unit 25 and the threshold change function of the threshold setting unit 24.

Figure 13:
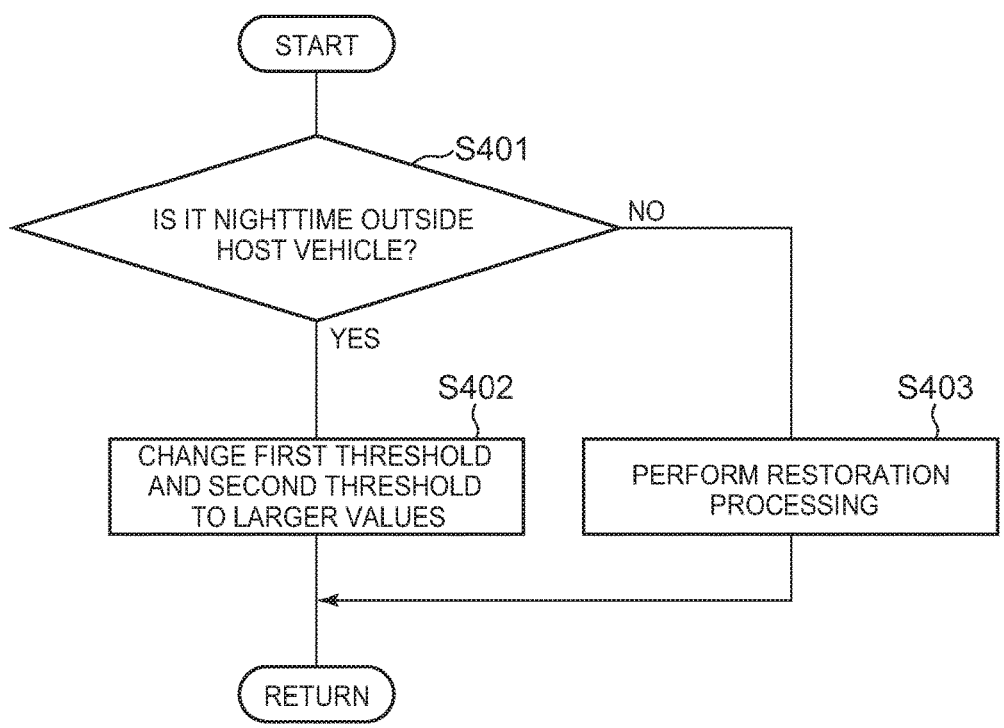
FIG. 13 is a flowchart showing the threshold change control of the display device in the second embodiment.

<Threshold change control of the display device in the second embodiment> The threshold change control of the display device 21 in the second embodiment is described below. FIG. 13 is a flowchart showing the threshold change control of the display device 21 in the second embodiment. The flowchart shown in FIG. 13 is started by the ECU 22 when the object information is displayed on the windshield W. When the processing of the flowchart shown in FIG. 13 reaches RETURN, the ECU 22 repeats the processing again beginning at START. The display device 21 can perform the display control, display change control, and redisplay control in the same manner as in the first embodiment. When the display of the object information is stopped in step S103 shown in FIG. 4, the ECU 2 terminates the processing of the flowchart shown in FIG. 13 even if the processing is not yet completed.

As shown in FIG. 13, the ECU 22 of the display device 21 determines in step S401 whether it is daytime or nighttime outside the host vehicle via the daytime/nighttime determination unit 23. For example, the daytime/nighttime determination unit 23 determines whether it is daytime or nighttime based on the illumination around the host vehicle detected by the illumination sensor. If it is determined to be nighttime outside the host vehicle (S401: YES), the ECU 22 proceeds to step S402. If it is determined to be daytime outside the host vehicle (S401: NO), the ECU 22 proceeds to step S403.

In step S402, the ECU 22 performs the threshold change control, in which the first threshold and the second threshold are changed (set) to larger values, via the threshold setting unit 24. In this step, the threshold setting unit 24 changes the values of the first threshold and the second threshold so that the values become larger than when it is determined to be daytime in step S401. If the display control unit 15 continuously reduces the display brightness or the display area as the distance between the host vehicle and the object becomes smaller (the first threshold and the second threshold are not used), the threshold setting unit 24 increases the third threshold instead of the first threshold and the second threshold. If the thresholds are already changed to larger values, the threshold setting unit 24 maintains the current state. After that, the ECU 22 terminates the current threshold change control and, after a pre-set time elapses, performs step S401 again.

In step S403, the ECU 22 performs the restoration processing to restore the first threshold and the second threshold (or the third threshold), which have been changed to larger values by the threshold setting unit 24, to the original values. If the first threshold and the second threshold (or the third threshold) are not changed to larger values in step S402, the threshold setting unit 24 maintains the current state. After that, the ECU 22 terminates the current threshold change control and, after a pre-set time elapses, performs step S401 again.

In step S402 in FIG. 13, the threshold setting unit 24 may change, not both, but only one of the first threshold and the second threshold. In this case, in step S403, the threshold setting unit 24 restores only the changed threshold to the original value.

<Effect of the display device in the second embodiment>
The display on the windshield W distracts the driver's attention and obstructs the driver from visually recognizing an object in the nighttime more often than in the daytime. Therefore, by setting the first threshold larger when it is determined to be nighttime than when it is determined to be daytime, the display device 21 in the second embodiment described above allows the display brightness or the display area to be reduced sooner based on the distance between the host vehicle and the object. In addition, by setting the second threshold or the third threshold larger when it is determined to be nighttime than when it is determined to be daytime, the display device 21 allows the display to be stopped sooner based on the distance between the host vehicle and the object.

In addition, when it is determined by the daytime/nighttime determination unit that it is nighttime outside the host vehicle, the display device 21 can reduce the display brightness or the display area as compared to when it is determined to be daytime. Therefore, according to whether it is daytime or nighttime, the display device 21 can appropriately reduce the possibility that the display of the object information on the windshield W obstructs the driver from visually recognizing the object.

While the embodiments of the present disclosure have been described above, it is to be understood that the present disclosure is not limited to the specific embodiments described above. The present disclosure can be implemented not only by the embodiments described above but also in a variety of modes in which various changes and modifications are added based on the knowledge of those skilled in the art.

What is claimed is:

1. A display device comprising:
an object detection unit that detects an object positioned ahead of a host vehicle;
a distance detection unit that detects a distance between the host vehicle and the object;
a display unit that projects a display of information on the object onto a windshield of the host vehicle;
a display control unit that controls the display unit, wherein the display control unit either reduces a brightness of the display when the distance between the host vehicle and the object is smaller than a first threshold as compared to when the distance between the host vehicle and the object is equal to or larger than the first threshold and stops the display when the distance between the host vehicle and the object is smaller than a second threshold that is smaller than the first threshold; or reduces the brightness of the display as the distance between the host vehicle and the object becomes smaller and stops the display when the distance between the host vehicle and the object is smaller than a third threshold;
a daytime/nighttime determination unit that determines whether it is daytime or nighttime outside the host vehicle; and
a threshold setting unit that either sets at least one of the first threshold and the second threshold to a larger value when the daytime/nighttime determination unit determines that it is nighttime outside the host vehicle than when the daytime/nighttime determination unit determines that it is daytime; or sets the third threshold to a larger value when the daytime/nighttime determination unit determines that it is nighttime outside the host vehicle than when the daytime/nighttime determination unit determines that it is daytime.

2. The display device according to claim 1,
wherein
the display control unit reduces the brightness of the display when the daytime/nighttime determination unit determines that it is nighttime outside the host vehicle than when the daytime/nighttime determination unit determines that it is daytime.

3. A display device comprising:
an object detection unit that detects an object positioned ahead of a host vehicle;
a distance detection unit that detects a distance between the host vehicle and the object;
a display unit that projects a display of information on the object onto a windshield of the host vehicle;
a display control unit that controls the display unit;
a position information acquisition unit that acquires position information on the host vehicle;
a map information storage unit that stores therein map information including parking area information;
a parking area determination unit that determines whether the host vehicle is positioned in the parking area based on the position information on the host vehicle and the map information, wherein the display control unit either reduces a brightness of the when the parking area determination unit determines that the host vehicle is positioned in the parking area and when the distance between the host vehicle and the object is smaller than a first threshold as compared to when the distance between the host vehicle and the object is equal to or larger than the first threshold, and stops the display when the distance between the host vehicle and the object is smaller than a second threshold that is smaller than the first threshold; or reduces the brightness of the display as the distance between the host vehicle and the object becomes smaller when the parking area determination unit determines that the host vehicle is positioned in the parking area, and stops the display when the parking area determination unit determines that the host vehicle is positioned in the parking area and when the distance between the host vehicle and the object is smaller than a third threshold;
a daytime/nighttime determination unit that determines whether it is daytime or nighttime outside the host vehicle; and
a threshold setting unit that either sets at least one of the first threshold and the second threshold to a larger value when the daytime/nighttime determination unit determines that it is nighttime outside the host vehicle than when the daytime/nighttime determination unit determines that it is daytime; or sets the third threshold to a larger value when the daytime/nighttime determination unit determines that it is nighttime outside the host vehicle than when the daytime/nighttime determination unit determines that it is daytime.

4. A display device comprising:
a display unit configured to project information on an object positioned ahead of a host vehicle onto a windshield of the host vehicle;
an electronic control unit that detects a distance between the host vehicle and the object and controls an information display on the display unit, wherein the electronic control unit either reduces a brightness of the display when the distance between the host vehicle and the object is smaller than a first threshold as compared to when the distance between the host vehicle and the object is equal to or larger than the first threshold and stops the display when the distance between the host vehicle and the object is smaller than a second threshold that is smaller than the first threshold; or reduces the brightness of the display as the distance between the host vehicle and the object becomes smaller and stops the display when the distance between the host vehicle and the object is smaller than a third threshold;
a daytime/nighttime determination unit that determines whether it is daytime or nighttime outside the host vehicle; and
a threshold setting unit that either sets at least one of the first threshold and the second threshold to a larger value when the daytime/nighttime determination unit determines that it is nighttime outside the host vehicle than when the daytime/nighttime determination unit determines that it is daytime; or sets the third threshold to a larger value when the daytime/nighttime determination unit determines that it is nighttime outside the host vehicle than when the daytime/nighttime determination unit determines that it is daytime.

5. A display device comprising:
a display unit configured to project information on an object positioned ahead of a host vehicle onto a windshield of the host vehicle;
a navigation system that stores therein map information including parking area information;
an electronic control unit configured to detect a distance between the host vehicle and the object, control the display unit, acquire position information on the host vehicle, and determine whether the host vehicle is positioned in a parking area based on the position information on the host vehicle and the map information, wherein the electronic control unit either reduces a brightness of a display when it is determined that the host vehicle is positioned in the parking area and when the distance between the host vehicle and the object is smaller than a first threshold as compared to when the distance between the host vehicle and the object is equal to or larger than the first threshold, and stops the display when the distance between the host vehicle and the object is smaller than a second threshold that is smaller than the first threshold; or reduces the brightness of the display as the distance between the host vehicle and the object becomes smaller when it is determined that the host vehicle is positioned in the parking area, and stops the display when it is determined that the host vehicle is positioned in the parking area and when the distance between the host vehicle and the object is smaller than a third threshold;
a daytime/nighttime determination unit that determines whether it is daytime or nighttime outside the host vehicle; and
a threshold setting unit that either sets at least one of the first threshold and the second threshold to a larger value when the daytime/nighttime determination unit determines that it is nighttime outside the host vehicle than when the daytime/nighttime determination unit determines that it is daytime; or sets the third threshold to a larger value when the daytime/nighttime determination unit determines that it is nighttime outside the host vehicle than when the daytime/nighttime determination unit determines that it is daytime.

* * * * *